US00RE39644E

(19) United States
(12) Reissued Patent
Alcorn et al.

(10) Patent Number: US RE39,644 E
(45) Date of Reissued Patent: May 22, 2007

(54) METHOD AND APPARATUS USING GEOGRAPHICAL POSITION AND UNIVERSAL TIME DETERMINATION MEANS TO PROVIDE AUTHENTICATED, SECURE, ON-LINE COMMUNICATION BETWEEN REMOTE GAMING LOCATIONS

(75) Inventors: Allan E. Alcorn, Portola Valley, CA (US); Richard L. Hale, Santa Barbara, CA (US)

(73) Assignee: IGT, Reno, NV (US)

(21) Appl. No.: 10/219,188

(22) Filed: Aug. 15, 2002

Related U.S. Patent Documents

Reissue of:
(64) Patent No.: 6,104,815
Issued: Aug. 15, 2000
Appl. No.: 09/004,822
Filed: Jan. 9, 1998

U.S. Applications:
(60) Provisional application No. 60/035,290, filed on Jan. 10, 1997.

(51) Int. Cl.
*A83F 9/24* (2006.01)

(52) U.S. Cl. ..... 380/251; 380/258; 463/16
(58) Field of Classification Search ..... 380/251, 380/258; 463/1, 16, 25, 29, 41, 42
See application file for complete search history.

(56) References Cited

U.S. PATENT DOCUMENTS

| | | | | | |
|---|---|---|---|---|---|
| 4,670,857 | A | | 6/1987 | Rackman | 380/4 |
| 5,003,595 | A | | 3/1991 | Collins et al. | 380/25 |
| 5,038,022 | A | | 8/1991 | Lucero | 235/380 |
| 5,043,736 | A | | 8/1991 | Darnell et al. | 342/357 |
| 5,323,322 | A | | 6/1994 | Mueller et al. | 364/449 |
| 5,326,104 | A | | 7/1994 | Pease et al. | 273/138 |
| 5,389,934 | A | | 2/1995 | Kass | 342/357 |
| 5,537,102 | A | | 7/1996 | Pinnow | 340/825.3 |
| 5,586,937 | A | | 12/1996 | Menashe | 463/41 |
| 5,618,232 | A | * | 4/1997 | Martin | 463/25 |
| 5,643,086 | A | | 7/1997 | Alcorn et al. | 463/29 |
| 5,757,916 | A | | 5/1998 | MacDoran et al. | 380/25 |
| 5,762,552 | A | | 6/1998 | Vuong et al. | 463/25 |
| 5,790,074 | A | * | 8/1998 | Rangedahl et al. | 342/357.13 |
| 5,830,069 | A | | 11/1998 | Soltesz et al. | 463/42 |
| 6,099,408 | A | * | 8/2000 | Schneier et al. | 463/29 |
| 6,306,038 | B1 | * | 10/2001 | Graves et al. | 463/40 |

* cited by examiner

*Primary Examiner*—Matthew Smithers
(74) *Attorney, Agent, or Firm*—Marshall, Gerstein & Borun LLP

(57) ABSTRACT

Method and apparatus for providing authenticated, secure, on-line communication between remote locations including a user terminal adapted to enable a player in one location to remotely communicate via a communications medium such as the Internet with a gaming host in another location. Location of the remote user terminal, the host server and universal time are determined using means for accessing signals generated by geostationary navigational transmitters, such as in the global positioning satellite (GPS) system. Player authentication (identity verification) is determined by use of a personal identification number (PIN) and an electronic signature verification service. Security of communication is accomplished through use of a public-key/private-key encryption system. The remote user terminal may be comprised of one or more discreet components adapted to be used with a laptop or desktop personal computer (PC), or may be embodied in a stand alone or self-contained single unit that is portable and communicates via radio waves, telephone lines or the Internet to a host server.

45 Claims, 10 Drawing Sheets

METHOD AND APPARATUS USING GEOGRAPHICAL POSITION AND UNIVERSAL TIME DETERMINATION MEANS TO PROVIDE AUTHENTICATED, SECURE, ON-LINE COMMUNICATION BETWEEN REMOTE GAMING LOCATIONS

Matter enclosed in heavy brackets [ ] appears in the original patent but forms no part of this reissue specification; matter printed in italics indicates the additions made by reissue.

This application claims the benefit of U.S. Provisional Application No. 60/035,290, filed Jan. 10, 1997.

FIELD OF THE INVENTION

The present invention relates generally to secure communications systems, and more particularly, to a method and apparatus for authenticating and securely communicating, in addition to transactional data, user location data and event time data relating to a computer-based transaction executed using an electronic communication medium interconnecting a remotely located player (client) and a casino (host server).

BACKGROUND OF THE INVENTION

Many on-line transactions that are completed using a computer require knowledge of the purchaser's actual location, identity and time, such as, for example, the purchase of controlled materials, cash transfer transactions, etc. Heretofore, in order to accommodate such transactions between remote locations, dedicated telephone lines or other secure communications systems have been required. However, as the Internet becomes the media of choice for many communications and commercial transactions, use of the Internet for transactions in which location, time and identity of the parties are required becomes problematic since prior to the present invention there was no way that the parties could be assured of the actual input time of the communication and the location of the other party.

One type of transaction for which the Internet appears particularly attractive is on-line gambling. However, gambling is a regulated industry all over the world. The regulations vary from total prohibition to nearly complete permissive wagering on almost unlimited subject matter. Today it is clear who has jurisdiction for both the establishment of regulations and their enforcement. In the USA, for example, the states have the authority, and the federal government supports the state's authority, to regulate gambling within its borders.

Some form of gambling is legal in all but two states; Utah and Hawaii. Currently, thirty-seven states permit state-sanctioned lotteries and twenty-three states have casinos, while others like California license card parlors. Seven states allow off-track paramutual betting on horse racing over the telephone. These activities are governed by a Gambling Commission established in each state, and the commissions govern the eligibility and licensing of all gambling players, games and businesses permitted to offer games in their state.

In 1976, the U.S. Congress appointed a National Gambling Commission to review the status of the then-current regulations. The Commission returned an endorsement of state sovereignty as to the issue. The few explicit exceptions were for gambling on Indian reservations, on cross-boundary waterways, and on commercial aircraft. The most frequently cited federal regulations are the Interstate Wire Act, 18 U.S.C. Section 1084, and the prohibition of illegal gambling businesses, 18 U.S.C. Section 1955. Both of these laws make federal crimes out of violation of state laws. Each is intended to support state enforcement of their laws.

Internationally, the scene is much the same; that is, the individual nation states regulate gambling within their borders. But there has to date been no successful regulation of gambling beyond a country's geopolitical boundaries. To avoid conflicts with the laws of a particular country, cruise ships that allow gambling are careful to be in international waters before they initiate game play. Jurisdiction is thus generally clear and there are usually few conflicts. The obvious conflicts have been covered domestically by federal laws.

It is important to note the importance of identifying both where the gambling occurs and who the parties (the host casino and the player) to the gambling activity are since it establishes both the legality of the gambling transactions and the jurisdiction for regulation and enforcement. This is of particular concern relative to remote gambling transactions made using a communication medium such as the Internet because one cannot always know where both the client (player) and the host server (usually at a casino) is located when the connecting medium is not "hard wire" connected from one end of the link to the other.

Today a player usually goes into a casino and walks around placing bets and playing games in surroundings that have evolved over many years. He knows where the casino is and the casino knows who and where the player is. Both parties have a sense of confidence that exposure of the transactions within the limits of the law are under control. Both parties know what it means to win and how the winner is to collect his winnings. Everything from access to cash, to knowledge of whether he wins or loses, is acceptably within the party's control or he doesn't play. It is therefore apparent that the security that physical presence in a casino offers versus electronically accommodated remote gambling, supported by bets delivered through electronic fluids transfer, is going to require an adjustment in thinking for both the individual gambler and the casino.

There are currently several individual websites which offer the opportunity to gamble on sports activities, various types of on-line games, and various types of lotteries. Payment for wins and losses are accommodated through use of deposit account and credit card transactions. The proprietors of such websites have taken the position that the gambling "transaction" occurs at the website, and so long as the "transaction" occurs within a jurisdiction where gambling is legal, the wagering, in their view, is legal. However, various state authorities have now taken contrary positions and it doesn't make any difference where the player is extant. In fact, during the past several years, several states have challenged such practices and legal battles in this regard persist.

In the world of the Internet, it is easy to disguise where the website computer executing an application, in this case gaming software, is located, and where the user, i.e., the player sending the transaction to the application, can be found. This means that one can "spoof" the computer at the gambling website into thinking that the remote player is in a venue where it is legal to play the game. Likewise, a website computer connected to the Internet can appear to be executing a game in a location where it is legal, while it is actually located in a jurisdiction wherein such gambling is illegal. In either case, both parties to the transaction may be subject to legal liability if one of them is a resident in a jurisdiction where cross boundary gambling is not legal.

Furthermore, in use of a communications medium that is subject to transmission delays, it is possible to change the apparent time of day of the player input to the extent that one could make a play after the legal period for wagering has expired, and yet appear to have entered his bet within the legal time window. This of course makes such play ripe for fraudulent opportunity. There is presently no facility on the Internet to preclude such actions. The Internet is presently used in innumerable non-wagering transactions; thus, any solution that is developed and used in the future must not be perceived as compromising in any way the fundamental assumed rights of the general Internet community.

Remote communication problems, in addition to party location and time of transactional activities that will require solutions in the gambling industry, be it through use of the Internet or any other communications medium, are authentication (identification) of both the casino and the player, privacy of the results of the transaction, security for the games to preclude tampering, and protection against unauthorized access to a player's financial accounts. Although some communications links, such as hardwire connections between remote terminals, are more or less secure, the Internet, in its current implementation, is not designed to be restrictive in any way; in fact, quite the opposite is true. It is probably the least restrictive communications medium in the world. It is also true that any action that may attempt to restrict a user's freedom on the Internet is met with massive resistance. Therefore, a solution to identifying the name and location of a player, and the name and location of the casino, as well as the security of the communications between them, must be carefully constrained to apply only to those who want or need to use it.

It will thus be appreciated that although licensing and taxing is normally done by local or state governments, and regulation is normally enacted at state and federal levels in the U.S., and at the nation's state level internationally, the application of regulations is geopolitical. And such regulations typically apply to the casino, the player and the type of game. To enforce the regulations, it is thus axiomatic that the physical location of both the player and the gaming establishment must be known. Furthermore, transactional legitimacy also requires the establishment of both the time and date of each transaction as well.

SUMMARY OF THE INVENTION

It is therefore a principal objective of the present invention to provide a transactional method and apparatus having means for determining the location of each party to a remotely linked transaction.

Another objective is to provide a system of the type described having means for determining the time of a transaction conducted between remote sites using an unsecured communication medium such as the Internet.

Still another objective of the present invention is to provide a system of the type described in which all communications between a remote player and a gaming site can be securely conducted.

Briefly, a presently preferred embodiment of the present invention includes the provision of a user terminal adapted to enable a player in one location to remotely communicate via a communications medium such as the Internet with a gaming host in another location. Location of the remote user terminal, the host server and universal time are determined using means for accessing the global positioning satellite (GPS) system. Player authentication (identity verification) is determined by use of a personal identification number (PIN) and electronic signature verification service. Security of communication is accomplished through use of a public/private key encryption system.

The remote user terminal may be comprised of one or more discreet components adapted to be used with a laptop or desktop personal computer (PC), or may be embodied in a stand alone or self-contained single unit that is portable and communicates via radio waves, telephone lines or the Internet to a host server.

An important advantage of the present invention is that it allows remote users to legally gamble at legal casino sites using an unsecured communications medium such as the Internet as the connecting medium.

Another advantage of the present invention is that it facilitates denial of gambling or other transactional privileges to those who are resident at locations or in jurisdictions that would make such transactions illegal.

Still another advantage of the present invention is that it assures that the time a wager is placed, or other action taken, is accurately determined and recorded.

A still further advantage of this present invention is that it assures security in the transaction.

These and other objects and advantages of the present invention will no doubt become apparent to those skilled in the art after having read the following detailed description of the preferred embodiment illustrated in the several figures of the drawings.

IN THE DRAWINGS

DETAILED DESCRIPTION OF THE PREFERRED EMBODIMENTS

Figure 1:
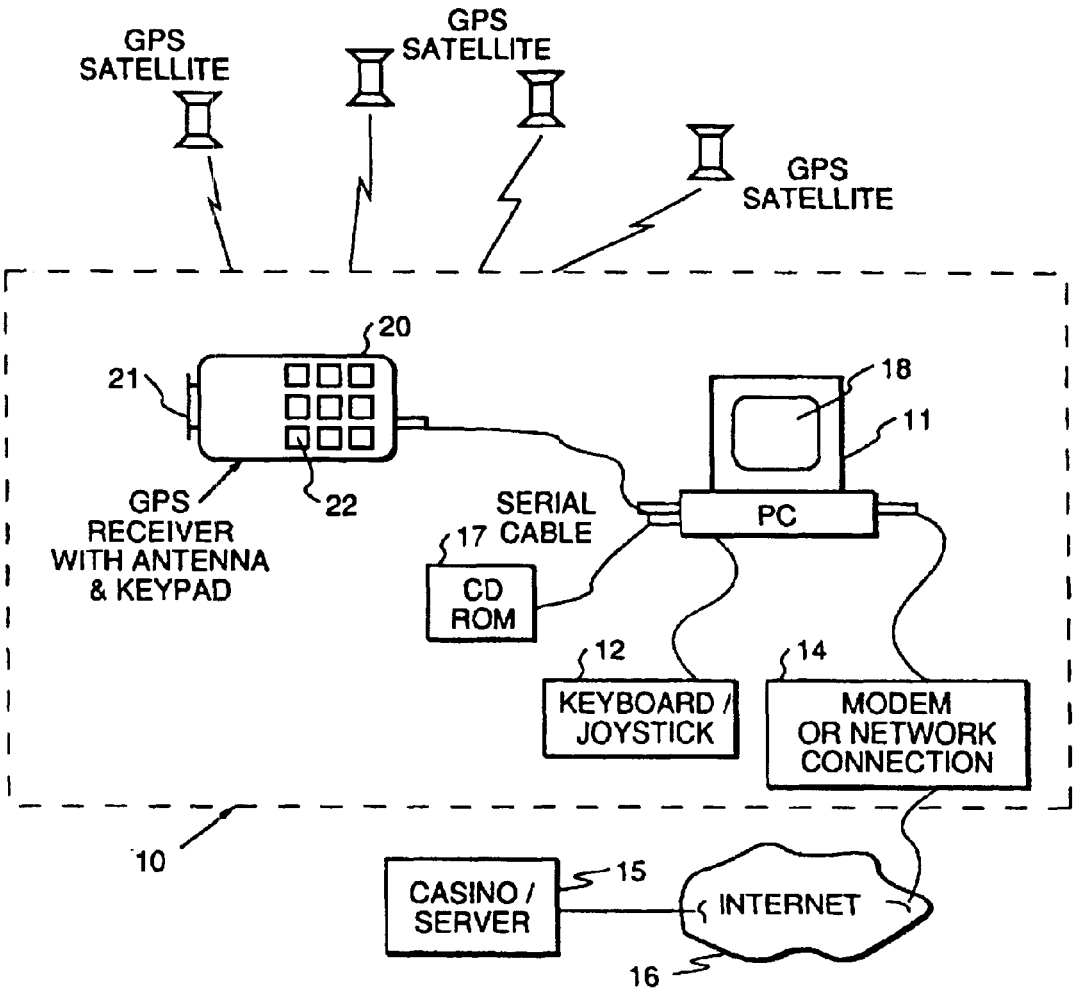
FIG. 1 is a block diagram schematically illustrating the principal functional components of a basic remote terminal in accordance with a first embodiment of the present invention linking a remote player to a gambling site via an unsecured channel such as the Internet.

Referring now to FIG. 1 of the drawing, a basic remote communication terminal assembly in accordance with the present invention is illustrated at 10 and includes a standard personal computer 11 having a keyboard and/or joystick 12, an internal or external modem 14 or other means of providing connection to a casino/server 15 via a communications network 16 such as the Internet, and a CD-ROM 17. In this particular example CD-ROM 17 contains a remote server public key and software, and software relating to one or more games or other subject matter to be displayed on the PC monitor screen 18 for viewing by a user. Also connected to the PC 11, via a serial cable 19, is a specially modified GPS receiver 20 including a public key encryption algorithm and a user private key stored in a manner that is not easily discovered. Receiver 20 also includes an antenna 21 as well as a keypad 22 for use by the user to insert his PIN number. Receiver 20 communicates with a satellite radio navigation system such as the "Global Positioning System (GPS)" or "Navstar". The Global Positioning System uses a plurality of satellites to enable detection of a position of any object-user equipped with a receiver sensitive to radio navigation signals generated by the system satellites. The Navstar system comprises a total of twenty-four (24) satellites, three per each of eight circular twelve hour orbits. The orbit planes are uniformly inclined to their adjacent orbits by sixty degrees, and the position of any satellite is precisely known for any moment of time.

The position fix of receiver 20 at or near any point on the Earth can be obtained by measuring the pseudo-distance to any four system satellites that are in the radio visibility zone of the receiver. Furthermore, pseudo-distance measurements allow determination of the receiver's time scale shift relative to the universal coordinated time. Although not necessarily relevant to the present invention, additional measurements of the radial pseudo-speed (the rate of pseudo-distance variation) also allows determination of the speed of movement of a user carrying the receiver.

All satellites of the Navstar system transmit a radio navigation pseudo-noise signal with the same carrier frequency f(c)=1572.42 MHz. Identification of each satellite in the system is by the individual ranging pseudorandom sequence assigned to the satellite and modulating the carrier. In one mode, termed the easily detected (C/A) signal mode, the pseudorandom sequence is designated the Gold Code with a code element transmission rate of 1.023 MHz, and each code sequence comprising 1023 elements so that the repetition of the sequence is one millisecond.

Along with the Gold Code sequence each satellite of the Navstar system transmits binary symbols at a fifty baud rate. These symbols carry information on the satellite'ephemerides and clock (navigation data necessary to calculate the receiver's position fix), and a synchronization code (preamble) marking the reference points of the navigation data. The preamble is repeated every six seconds in the form of an eight-symbol Barker code. The serially transmitted preamble and navigation data constitute a navigation message composed of lines of six second length.

The radio navigation signal generation and transmitting subsystem on board the Navstar system satellites comprises a high precision time and frequency standard, a carrier frequency generator, a Gold Coded psuedorandom sequencer (individual for each satellite), a navigation data generator, a synchronization code generator, a modulating signal generator to provide two postional (zero degrees minus 180 degrees) phase modulation of the carrier frequency (this modulating signal being a modulus 2 sum of the navigation message symbols), and pseudorandom sequence elements, and a transmitter.

In receiver 20 the arriving radio navigation signal is correlated to a reference signal. The heterodyne frequency of the reference signal is fixed relative to signals received from all satellites of the Navstar system, and the generated copy of the Gold coded sequence varies in accordance with a particular satellite signal being received. The correlation between the Gold Coded sequence and its copy is analyzed until the auto correlation function obtains its maximum (auto correlation peak), this evidencing synchronism between the Gold Coded sequence and its copy. On obtaining this synchronism, as well as the synchronization of the carrier frequency phase, the pseudo-distance (and the pseudo-speed if used) is measured and the navigation message is received.

As indicated above, receiver 20 is a specially modified GPS receiver, and includes secure IC devices with RSA keys, a means for executing the public key algorithm (RSA), a keyboard that allows the user to enter his PIN number, a front-end reception circuit to amplify, filter and convert the frequency of signals arriving from the output of its receiving antenna 21, a local oscillator and other reference frequency generators, and a psuedorandom sequence delay detector and tracking device. The delay detector and tracking device comprises a received Gold Code copy generator, a carrier frequency detector and tracking unit, a navigation message demodulator to detect the synchronization code and navigation data, and a navigation processor. The latter component uses the detected synchronization code to set the reference point of the received navigation data (start of the navigation message line), and the output data from the Gold Code detection and tracking unit and from the carrier frequency detection and tracking unit to execute measurements of the pseudo-distance (and radial pseudo-speed). Serial or parallel processing of the signals arriving from four satellites allows this processor to thereafter calculate the position fix (and perhaps speed) of the receiver along with a correction factor for its time scale.

It will thus be apparent that receiver 20 will develop a very accurate universal time signal and position information accurate to within approximately 100 meters. This data along with the users PIN number is encrypted by the RSA encryption system contained within the unit 20 and coupled into an input port of PC 11.

During operation of the system illustrated in FIG. 1, where the system is used as a gaming terminal, PC 11 will allow a user to select a game resident on CD-ROM 17 and commence play thereof on the monitor screen 18 using the keyboard/joystick unit 12 for input. However, prior to game play, communication must be first established with the casino/server 15.

Figure 2:
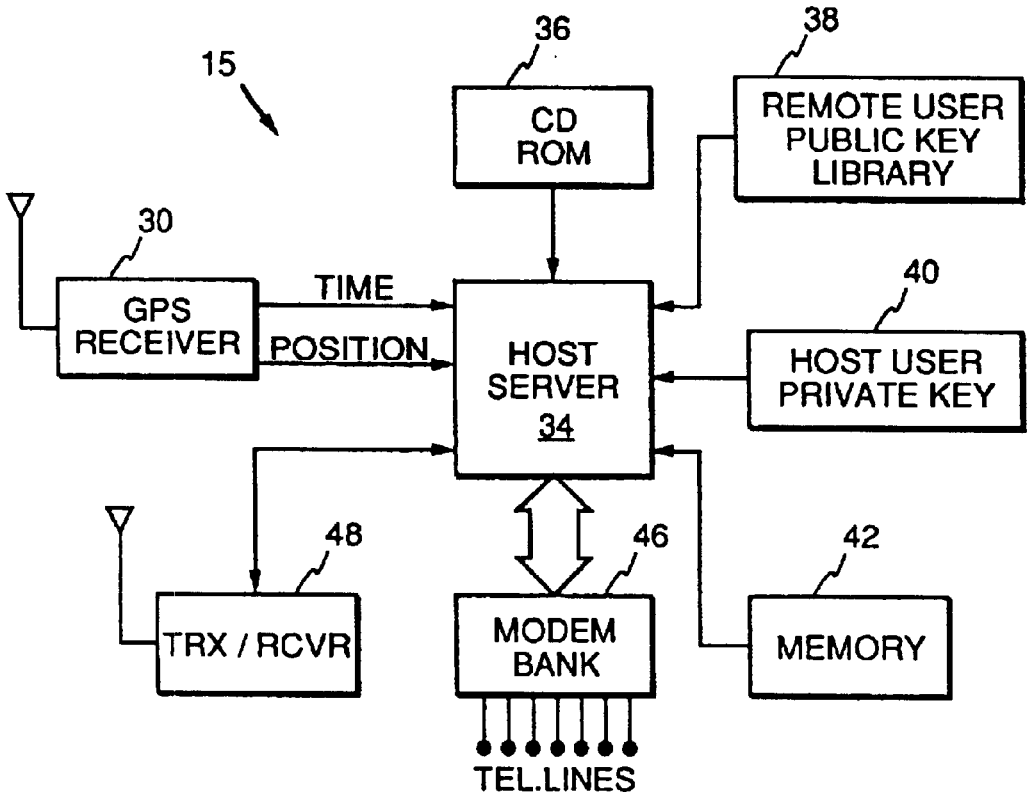
FIG. 2 is a block diagram generally illustrating a gaming host system in accordance with the present invention.

As indicated generally in the block diagram of FIG. 2, a similar GPS receiver 30 located at and operatively associated with the server of the host system shown generally at 32, may also be used to communicate universal time and position information back to the remote user to positively identify and synchronize the system during the initial establishment of communication between the parties. The casino system 15 may further include a host server 24 configured similar to the system described in U.S. Pat. No. 5,643,086, a CD ROM or other unalterable memory 36 containing system operating software, authenticating software, executive loader programs, system drives, encryption algorithms, etc., a remote user (player) public key library 38, a host server private key 40, mass memory 42 and a modem bank 46 or other networking subsystem coupled to the Internet for facilitating communication with a plurality of remote users. Alternatively, or additionally, the system 15 may also include means such as the transmitter/receiver 48 for communicating with the remote units via other media.

It may also be desirable to authenticate the operating system and game software resident in the server and each terminal using a method such as that disclosed in U.S. Pat. No. 5,643,086, expressly incorporated herein by reference.

Figure 3:
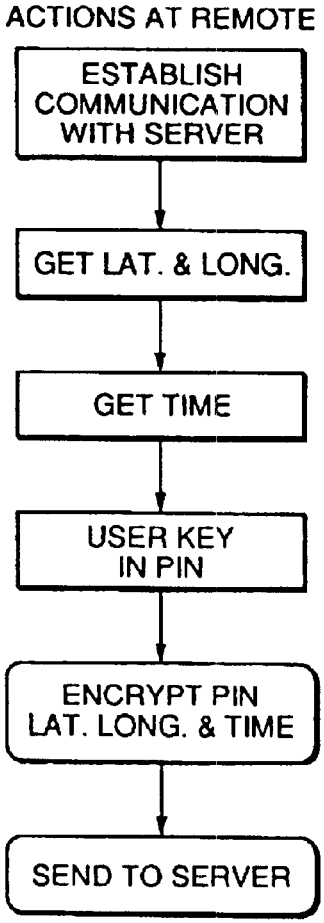
FIG. 3 is a high level flow chart generally illustrating the sign-on operation of the remote user terminal of FIG. 1.

As indicated in the flow diagram of FIG. 3, in accordance with this basis system, the user PC 11 will first establish communication with the casino server 15 via the modem or network connection 14 and Internet 16. It will thereafter obtain time and position information in terms of a latitude and longitude signal from receiver 20, and will instruct the user to key in his PIN number. The PIN number, position information, and time will then be encrypted using a suitable encryption system, such as the RSA public-key/private-key crypto system and be sent to the server 15 via the Internet or other suitable communications link.

Figure 4:
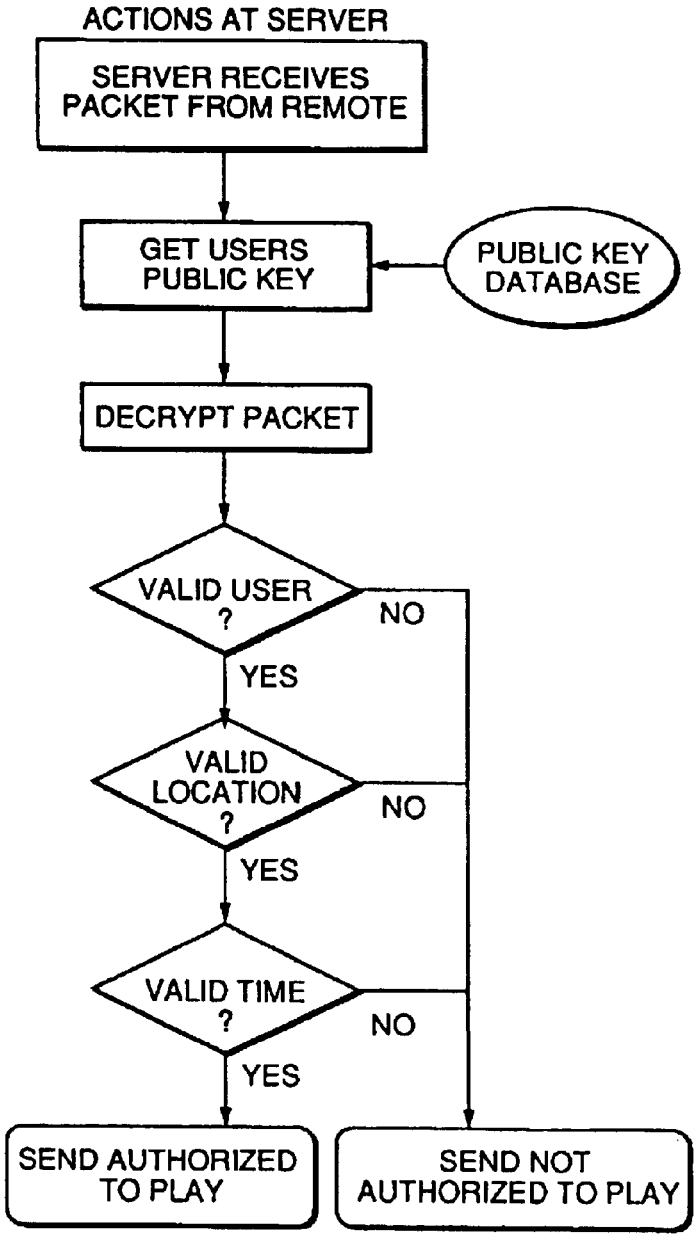
FIG. 4 is a high level flow chart generally illustrating the basic remote user authentication process as implemented at the gaming server site of FIG. 2.

As indicated in FIG. 4, the server will subsequently receive the packet of information from the remote user, retrieve the user's public key from a public key database, decrypt the packet and determine whether or not the decrypted information identifies a valid user. If not, it returns a "not authorized to play" signal to the remote user. On the other hand, if it is determined that the user is valid, the server next determines from the latitude and longitude information received from the remote user whether or not the user is at a valid location. If the indicated location is not valid, i.e., it is in perhaps another county, or another state, or another country in which gaming is not permitted, the system returns a "not authorized to play" signal. If the location is determined to be valid, the transmitted time signal is tested for validity and if it is not a valid time, the "not authorized to play" signal is returned. However, if the time is valid, then an "authorized to play" signal is returned to the remote unit and play is allowed to commence. As part of this initial "handshaking" operation, the server may also take other steps to qualify the remote user, such as for example, checking to see that the user's previously opened account is in order and that the user has an adequate credit balance or the like.

In a public-key/private-key crypto system each member of the system has two keys, a public key and a private key. The public keys are available to all members of the system, but the private keys are known only to their owners. Both of these keys are usually integer digital numbers that are nearly impossible to guess, to compute or to determine one from the other. They are typically very large integers of approximately 100 digits. Despite their enormous sizes, they can be easily created using well known methods. The principle concept enabling the use of these "digital signatures" is the extreme difficulty of factoring the product of two large prime numbers. Although there exist algorithms than can output the prime factors of any input series of numbers, if the primes in the factorization are two one-hundred digit integers, then even the best algorithm, run on the fastest computer of today's technology takes an extraordinarily long period of time. On the other hand, finding such arbitrary prime numbers and using them in the creation of the keys is quite easy and can be done in a matter of minutes. Thus even though the creation of the private key and public key is not a time consuming process, determination of the private key from the public key is a very difficult and time consuming task. In using public-key/private-key encryption systems, a sender can use his private key as his digital signature. Since this private key is known only to him and need not be shared, a forgery of the signature is not possible using today's algorithms.

On the other side of the communication link, the receiving server can confirm the authorship of a message by using the public key of the sender to decrypt the message. Thus, the public key provides an accurate authentication of the sender. Furthermore, by encrypting the transmitted message with the receiver's public key, the sender prevents third party intruders from obtaining the message in plain text form. Although the intruders may know the public key of the sender, they still need the private key of the intended receiver in order to decrypt the intercepted message. Hence, as long as the private key is private to the receiver, an intercepted message cannot be interpreted by an intruder.

Accordingly, in this simple embodiment of the present invention, once the communication link has been established and authenticated, and the user is authorized to play a game (or engage in some other transaction), he can immediately commence play by making an appropriate input via keyboard/joystick 12. In the case of a slot-machine type game, such input might be representative of the actuation of a "play" button, or the pull of a slot-machine handle. In response thereto, PC 11 will display on its monitor 18 a representation of the game being played and communicate the player input to the server 15. The server will in turn energize a random number generator, determine a game output, and communicate the output back to the PC which in turn selects an appropriate game ending routine and displays a corresponding result. In the case of a win, the casino server will have credited the player's account with the winning amount after having initially decremented the player's account by the amount originally wagered. The game can be continuously played in this manner with all communications being encrypted and decrypted at both ends of the communications channel, and with the ultimate result being that even though the Internet channel is an unsecured channel, the encryption renders the transactional communication secure.

Figure 5:
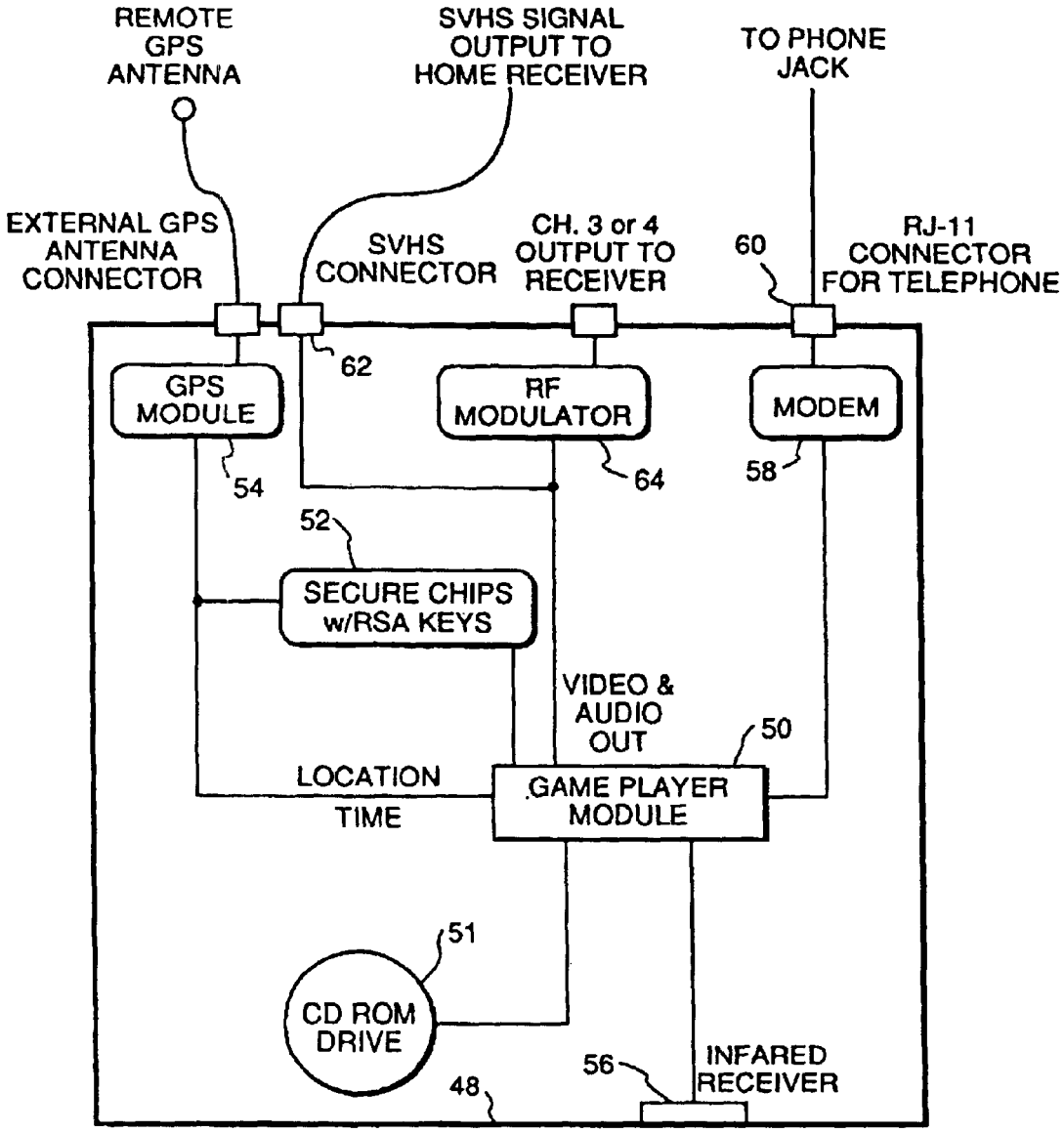
FIG. 5 is a simplified block diagram illustrating a unitary, dedicated gaming terminal device in accordance with a second embodiment of the invention for use with a video receiver.

An alternative version of the present invention is embodied in a "set-top box" configuration as depicted at 48 in FIG. 5 and includes a game player module 50 and associate CD-ROM drive 51, specifically adapted for use with a conventional home video receiver. In this embodiment, the public-key/private-key secure loader 52 is embodied in one or more IC chips directly assocaited with, or perhaps made an integral part of the GPS module 54, or other time and position signal generator, so that the encryption function is applied to the time and position data before it otherwise enters the gaming module. This further militates against tampering with the security features of the system. Player input to this unit is through a handheld remote control unit (not shown) that includes an infrared transmitter which generates infrared control signals that are coupled to the unit through an infrared receiver port 56 or the like.

Figure 6:
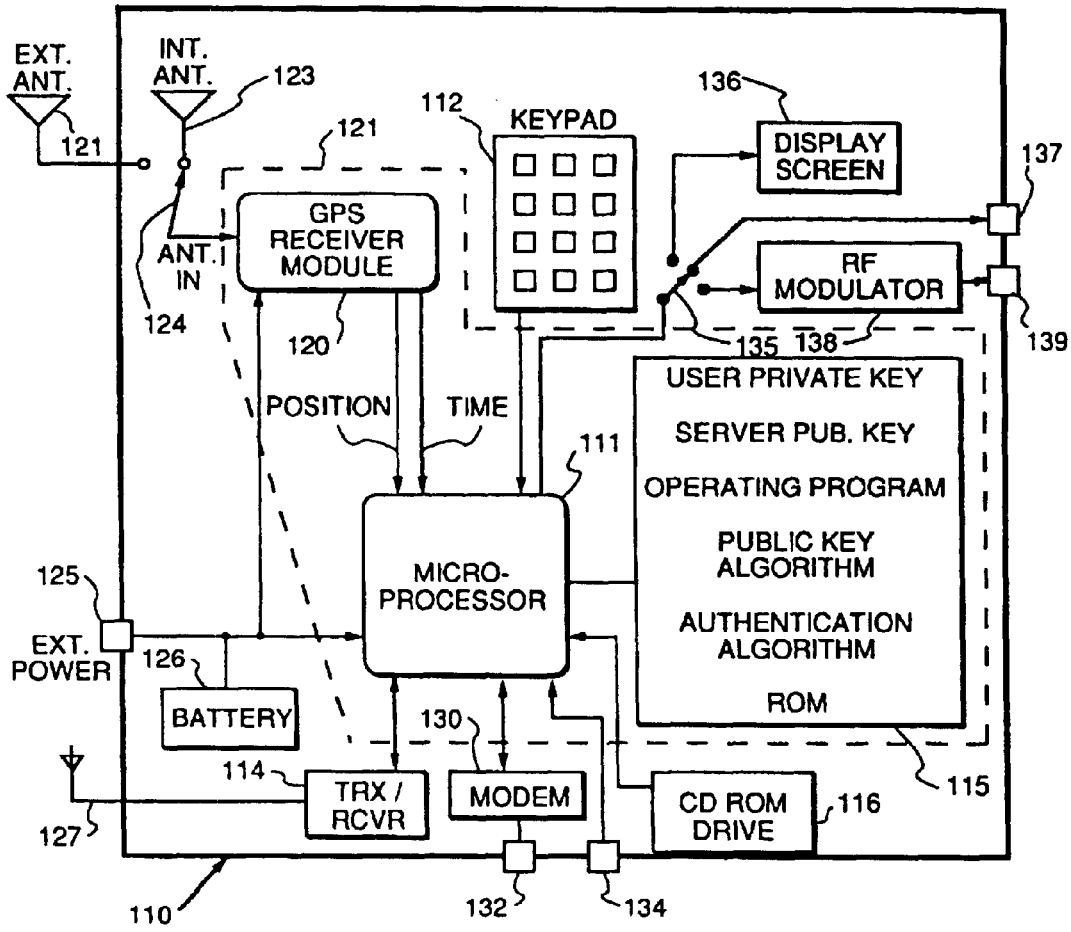
FIG. 6 is a block diagram illustrating the principal components of a self-contained user terminal in accordance with a third alternative embodiment of present invention.

Referring now to FIG. 6 of the drawing, an alternative embodiment of the present invention in unitary form and incorporating functional elements corresponding to the essential components of the assembly 10 of FIG. 1 is illustrated at 110. As depicted, the unit 110 includes a microprocessor 111 having an input keypad 112, a transmitter/receiver 114, an unalterable secure memory (ROM) 115, a CD/ROM drive or the like 116, a GPS receiver module 120, and external and/or internal GPS antennas 121 and 123 that may be selectable by a switch 124. Power to the device may be externally applied using conventional means, coupled at 125, and/or be provided by an internal battery means 126. Transmitter/receiver 114 may be capable of communicating with a remotely located server via radio waves using antenna 127. The unit also includes a modem 130 and an RJ11 output 132 for connection to an external telephone line coupled to a communications medium such as the Internet. In addition, microprocessor 111 may be capable of communicating directly via a cable network or the like through a serial port 134. The unit preferably includes a switch (135) for alternatively selecting between an included LCD display screen or the like 136, an SVHS output port 137 to which an external video monitor could be connected, or an RF modulator 138 and associated cable connector 139 that can be connected for input to particular channels of an external video monitor.

In this embodiment, ROM 115 will be programmed to include the user's private key, the server's public key, an operating program for microprocessor 111, a public key/private key encryption algorithm and an authentication algorithm. Games, catalogs or other data to be implemented in use of the unit can be loaded via CD/ROM drive 116. In order to enhance the security of the unit, it is preferable that at least the components 111, 115 and 120 be mounted to a single circuit board and perhaps be encapsulated so as to discourage tampering. Since the microprocessor 111, ROM 115 and GPS module 120 are integrated into a single unit 121, it can be assured that all data and software entering the unit can be authenticated, and all data transmitted between the remote unit 110 and the casino server is encrypted.

It will thus be appreciated that the present invention can be implemented in many forms to provide a remote terminal means for enabling commercial transactions of any type to be made with different levels of security even though the communication is made over an insecure link, be it the Internet, radio waves, a telephone network or a cable medium. The system has particular utility for transactions in which time and location of the respective parties is critical, and security of communication is required. The user's location and the server location are assured by the incorporation of the GPS subsystems, user identification is ensured by the use of a PIN number or other personal identifier, and security of communication is ensured by the use of public-key/private-key encryption.

In a preferred gaming implementation, a gaming casino might provide remote gamblers with a unit such as that depicted in FIGS. 5 and 6, having ROM preprogrammed with a user private key specific to the unit, a server public key specific to the casino, an operating program appropriate for game play, and software for enabling encryption and decryption of communicated signals. Games, screen display data, etc., would be supplied by means of a CD-ROM loaded into the CD-ROM drive and the remote user could communicate with the casino via a telephone connection or by a radio linkage. Game display could be made on an integrated LCD screen, or the like, or a TV monitor could be connected to an appropriate port to display the game in video format.

Player module 50 is coupled to the Internet or other medium via a modem 58 and RF-11 telephone type connector 60. The output of unit 48 to a player interface such as a TV or video monitor (not shown) may be accomplished by direct connection via an SVHS connector 62 or by coupling it through an RF modulator 64 for output as a channel 3 or 4 signal to a TV monitor.

Figure 7A:
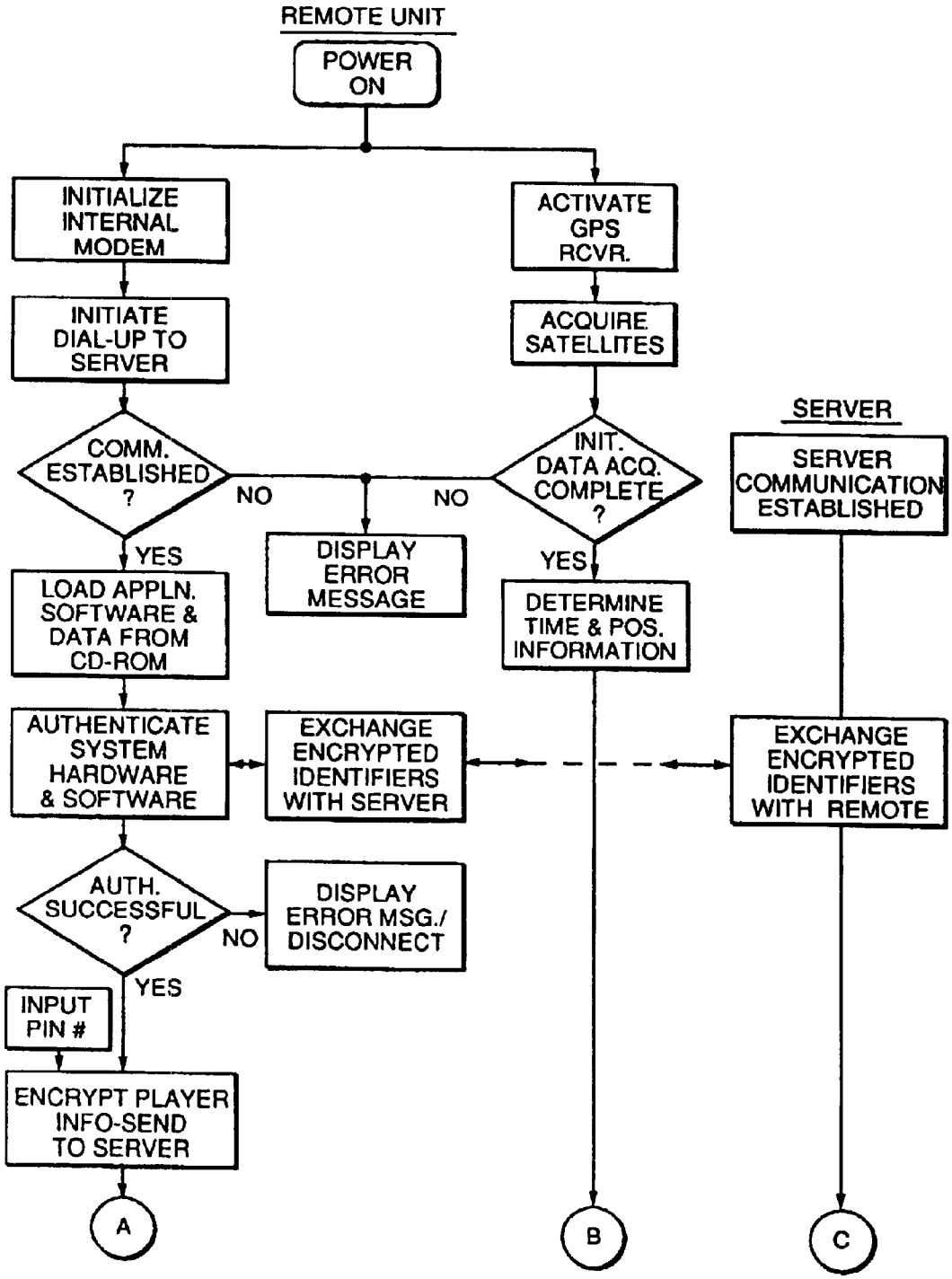
FIGS. 7a–7c is a flow chart illustrating operation of the present invention.
Figure 7B:
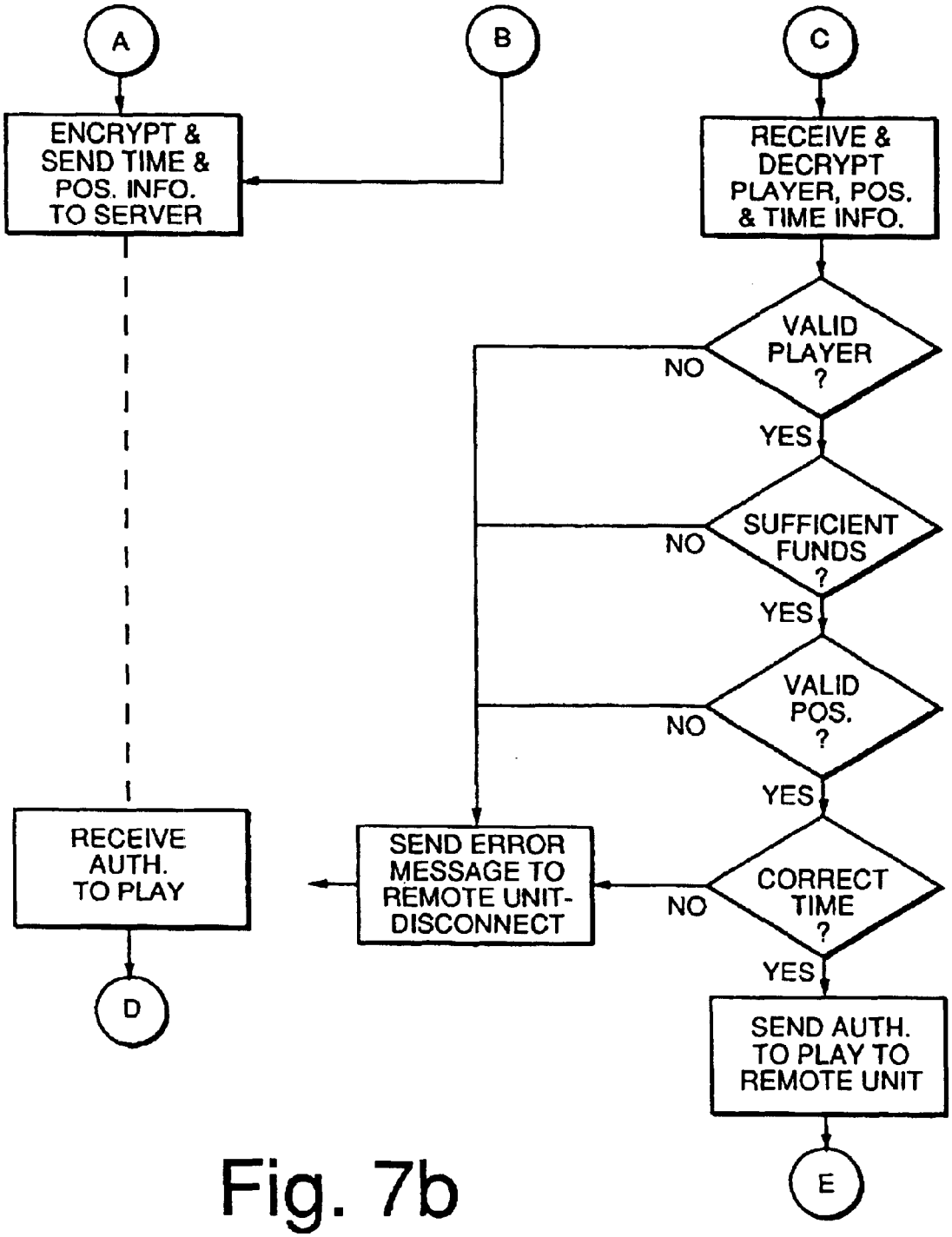
Figure 7C:
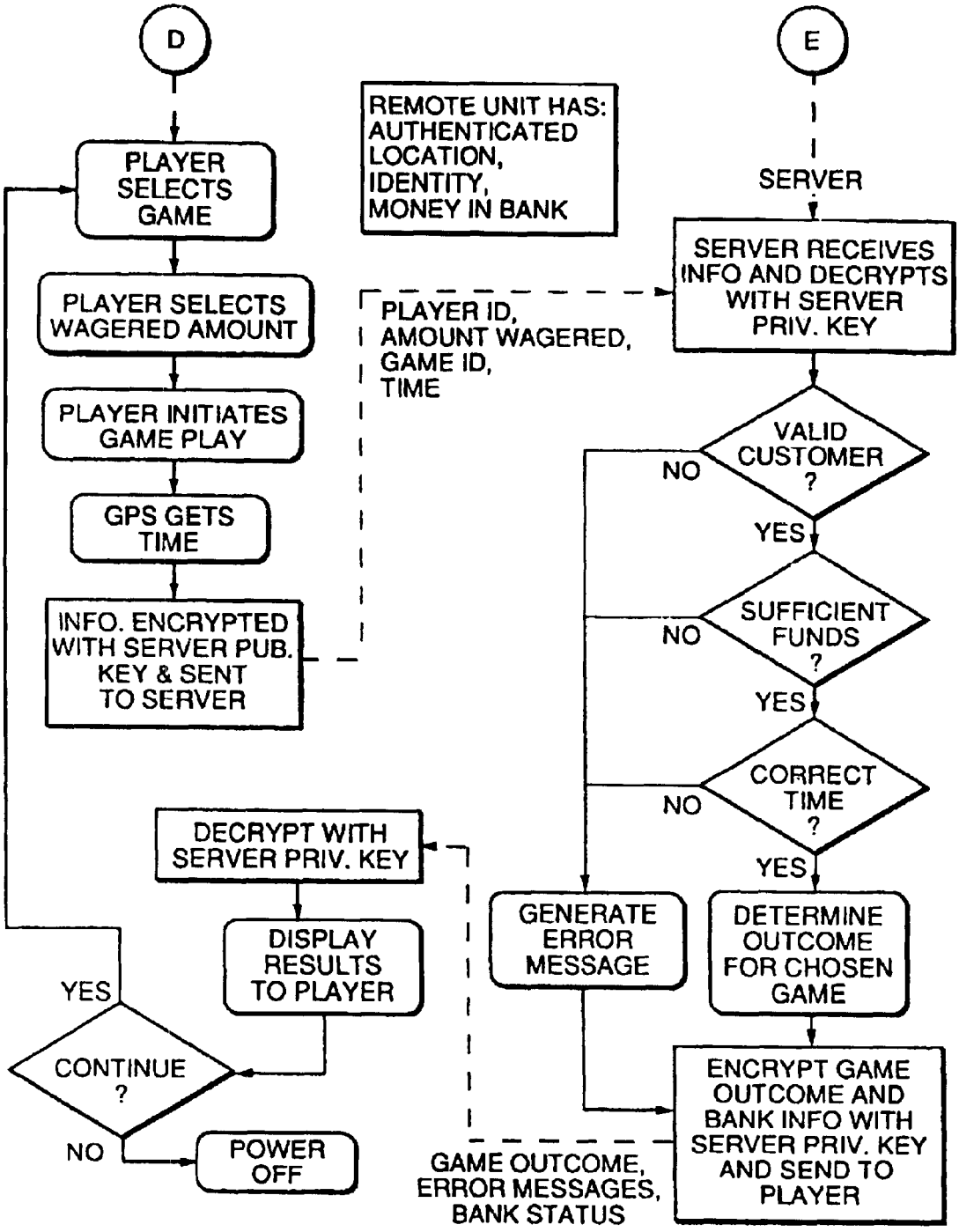

FIGS. 7a–7c comprise a flow chart illustrating detail operational sequence followed in use of a gaming system in accordance with the present invention. The player will start the gaming activity by turning the power on to his remote unit. At this time, the following sequence of events is initiated, although the order may vary:

a. The internal modem is initialized;

b. The GPS receiver is activated and starts collecting signals broadcast by available/visible satellites;

c. The modem initiates dial-up connection to the server; and d. The application software and data (games, casino simulation, advertisements, etc.) are loaded into the remote unit from the CD ROM. In the preferred embodiment this software and data is authenticated using the method described in the referenced U.S. Pat. No. 5,643,086.

The initializing sequence is complete when the remote unit/server communications are established and initial data acquisition from the GPS is complete. Initial GPS data acquisition being complete means that there are sufficient satellites in view of the remote unit to determine the geoposition of the player (i.e., the position of his remote unit). If either of these events does not complete and error conditions occur, an appropriate error message will be displayed to the player.

The next series of events involves the exchanging of encrypted identifiers between the remote unit and the server to mutually authenticate the system. This insures knowledge of the identity of both the server and the remote unit and confirms that neither has been modified without authentication. If any part of the authentication process is unsuccessful, an appropriate error message is displayed to the player, the server will record whatever information it can, and the modem will disconnect the remote unit from the server.

Once the remote unit, server and application software are initialized and authenticated, the player is prompted to enter his PIN number (or possibly a player identifier and PIN number). This player information is encrypted and sent to the server along with the player's encrypted signature. The server decrypts the received message and confirms that this player has a valid account and is authorized to use this particular remote unit. At this time the player can access many on-line casino functions that do not involve gambling.

In order to entitle the player to commence legal gaming, the agency (or agencies) having jurisdiction over the player and the casino must be established. Jurisdiction is established by determining the locations of the casino, the player and possibly the server. The location of the casino is known, and the location of the server is controlled by the casino. What must be specifically determined is the location of the player. Furthermore, for some applications, the exact time of a transaction, to an as yet to be established precision, must be known. For purposes of establishing jurisdiction, the geopostion of the player's remote unit is defined to be the location of the player. The remote unit's location and the precise time is computed from GPS signals. The player's location is registered relative to jurisdictions allowing legal gambling, and he is allowed to proceed. If the player is not in a location where gambling is legal, he is notified in real time and the remote unit is disconnected from the server.

Encryption is needed for authenticating transactions and insuring player privacy. The player selects his game and the play for processing by the remote unit. The play is typically comprised of the selection of the next move and the amount of the wager. In the remote unit, the play selection is combined with a game identifier; the player's PIN number or other ID and the time the play was selected. Time is determined continuously from the GPS data. This data taken together forms the transaction request to the server. The remote unit encodes the data and transmits it via the communication return path and its internal modem (or other return path as suggested above) to the server.

Upon receipt of a complete transaction request, the server records the request and determines the transaction result. The result is the next state for the game (e.g., RNG output), and the effect of the transaction on the player's credit account. These data are then encrypted and returned to the players remote unit via the communicating return path. Upon receipt of the return transmission, the remote unit decrypts and authenticates the communicated data, computes the display for the next state of the player's game, and presents the output of the play on a display screen. The remote unit is now ready to accept the player's next selection.

When the player desires to terminate play, he powers off the unit. The server is aware when power is turned off at the remote unit because the connecting line or other medium "hangs up." This is the only indication needed to notify the server that the player is finished playing. The server at this time closes all open activities linked to the player's session.

The critical elements of the system are thus the means for insuring:

1. That both the remote unit and server have not been tampered with;
2. That the application software in the remote unit has not been tampered with;
3. That the geophysical or geopolitical location of the player is legal;
4. That the player is identified to at least a PIN number level of confidence;
5. That the transactions are not tampered with while being transmitted to the server; and
6. That each transaction is precisely time-tagged.

All of these elements are required for this application of the technology. It will, of course, be appreciated that although the preceding is a description of a sequence of events defining the normal operation of the system, the exact sequence of events may change somewhat with an alternative implementation of the invention.

Figure 8:
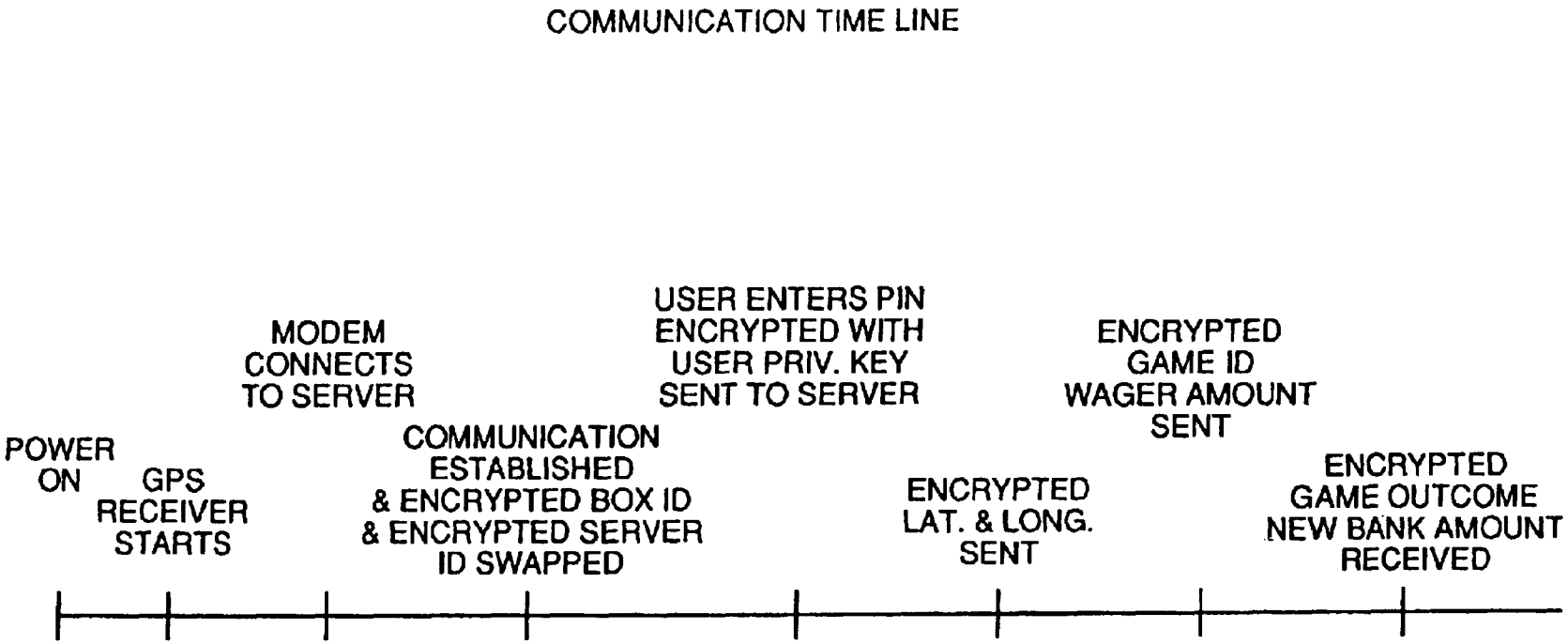
FIG. 8 is a communications time line diagram corresponding to the flow chart of FIGS. 7a–7c.

FIG. 8 depicts an operational time line for communication between a remote player unit (client) and a casino system (server).

Figure 9:
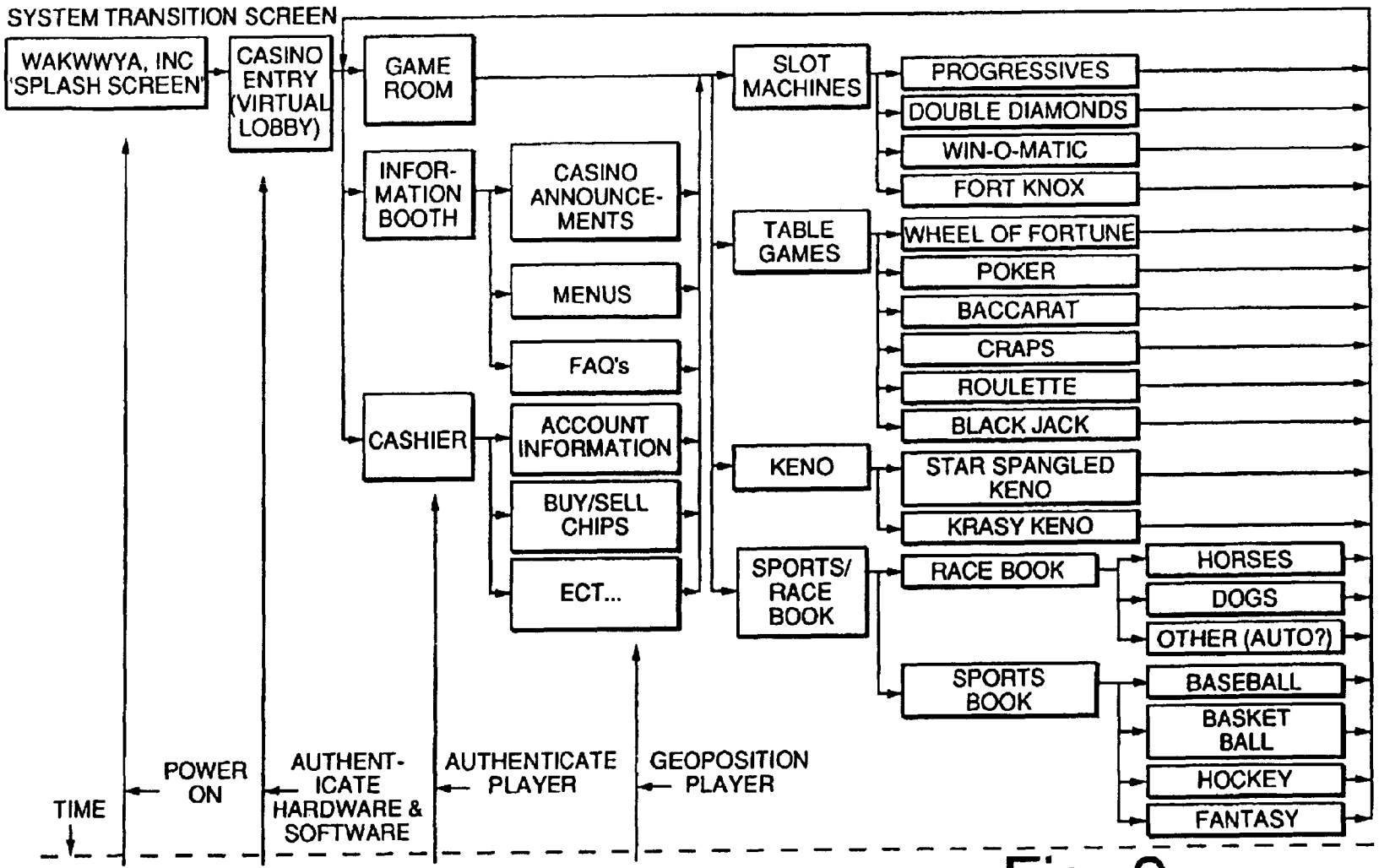
FIG. 9 is a block diagram illustrating typical screen displays presented during play of the preferred embodiments.

FIG. 9 suggests in topical format the nature of the screens that might be presented to the player during game play using the remote player unit.

Although the present invention has been described above in terms of several specific embodiments, it is anticipated that alterations and modifications thereof will no doubt become apparent to those skilled in the art. It is therefore intended that the following claims be interpreted as covering all such alterations and modifications as fall within the time, spirit and scope of the invention.

What is claimed is:

1. An electronic gaming system for enabling one or more player terminals, disposed at locations remote from a host server, to communicate with the host server in a secured transactional mode wherein the host server is informed as to the location of the player terminals so that it can permit or deny game play based in part on geopolitical or geographical restrictions, comprising:

a communications medium;

at least one player terminal apparatus disposed at a first location and including electronic game playing means for enabling a player to enter player identification data, to make a wager by inputting wager data, to commence game play by causing a start play signal to be generated, and to receive an indication of the game play results in the form of a response signal, electronic locating means for generating location data indicating the present geographical location of said player terminal apparatus and for generating time data evidencing universal time, first encryption means for encoding said player identification data, said wager data, said location data and said time data, and for decoding said response signal, and first communication means responsive to said start play signal and operative to transmit the encoded data to said communications medium; and host server means disposed at a second location remote from said first location and including second communication means for receiving the encoded data transmitted through said communication medium, second encryption means for decoding the transmitted encoded data and for encoding a response signal, and means for using the decoded identification data, wager data, location data and time data to determine the eligibility of the player based in part upon the player's geographical position, and if the player is qualified, to generate a response signal to be encoded and returned to said player terminal apparatus through said communications medium.

2. An electronic gaming system as recited in claim 1 wherein said game playing means includes a microprocessor, operating system software, and game software which, when processed by said microprocessor, develops electronic data for driving a display means that generates graphical images depicting game play.

3. An electronic gaming system as recited in claim 2 and further comprising read only memory (ROM) means for storing said operating system software and encryption software for execution by said microprocessor to implement said first encryption means.

4. An electronic gaming system as recited in claim 3 wherein said terminal apparatus further includes authentication means for authenticating software to be executed by said microprocessor.

5. An electronic gaming system as recited in claim 1 wherein said player identifier data corresponds to a unique personal identification number (PIN) assigned to a particular player.

6. An electronic gaming system as recited in claim 1 wherein said electronic locating means includes a radio navigation means responsive to input signals broadcast from multiple geostationary transmitting sources and operative to calculate position coordinates constituting said location data.

7. An electronic gaming system as recited in claim 6 wherein said game playing means includes a microprocessor, operating system software, and game software which, when processed by said microprocessor, develops electronic data for driving a display means that generates graphical images depicting game play.

8. An electronic gaming system as recited in claim 7 and further comprising read only memory (ROM) means for storing said operating system software and encryption software for execution by said microprocessor to implement said first encryption means.

9. An electronic gaming system as recited in claim 8 wherein said terminal apparatus further includes authentication means for authenticating all software executed by said microprocessor.

10. An electronic gaming system as recited in claim 6 wherein said radio navigation means is a global positioning satellite (GPS) location system.

11. An electronic gaming system as recited in claim 1 wherein said first encryption means and said second encryption means are remotely disposed components, implementing a public-key/private-key crypto system.

12. An electronic gaming system as recited in claim 11 wherein said first and second communication means include modems for transmitting and receiving said encoded data to and from said communication medium via telephone lines.

13. An electronic gaming system as recited in claim 12 wherein said communications medium includes the Internet.

14. An electronic gaming system as recited in claim 4 wherein said first encryption means and said second encryption means implement a public-key/private-key crypto system to encode and decode data communicated between said player terminal apparatus and said host server means.

15. An electronic gaming system as recited in claim 14 wherein said electronic location means includes a radio navigation means responsive to input signals broadcast by multiple geostationary transmitting sources and operation to calculate position coordinates constituting said location data.

16. An electronic gaming system as recited in claim 15 wherein said host server means further includes an electronic locating means for generating location data indicating the location of said host server means and for generating time data evidencing universal time for synchronizing with said player terminal apparatus, and wherein the location data is communicated to said player terminal apparatus to confirm receipt of wager data.

17. An electronic gaming system as recited in claim 1 wherein said host server means further includes a remote user public-key library containing public-key of authorized players for use in encoding and decoding data communicated between said player terminal apparatus and said host server means.

18. An electronic gaming system as recited in claim 17 wherein said player terminal apparatus further includes CD ROM means for containing gaming software to be executed by said microprocessor means to develop gaming signals for driving said display screen to present a graphical description of the game to a player.

19. An electronic gaming system as recited in claim 18 wherein said terminal apparatus further includes authentication means for authenticating software to be executed by said microprocessor.

20. An electronic gameing system as recited in claim 13 wherein said electronic locating means includes a radio navigation means responsive to input signals braodcast from multiple geostationary transmitting sources and operative to calculate position coordinates constituting said location data.

21. An electronic gaming terminal for disposition at a location remote from a host server and for communicating with the host server in a secured transactional mode, over an unsecured communications medium, informing the host server as to the geographical location of the gaming terminal so that the host server can permit or deny game play by the player based in part on predetermined geopolitical or geographical restrictions, comprising:

electronic game playing means for enabling a player to enter player identification data, to make a wager by inputting wager data, to commence game play by causing a start play signal to be generated, and for receiving an indication of game play results in the form of a response signal;

electronic locating means for generating location data indicating the present geographical location of said gaming terminal and for generating time data evidencing universal time;

encrypting means for encoding said player identification data, said wager data, said location data and said time data, and for decoding a response signal; and communication means responsive to said start play signal and operative to transmit the encoded data to a host server via a communications medium.

22. An electronic gaming terminal as recited in claim 21 wherein said game playing means includes a microprocessor, operating software, and game software which, when processed by said microprocessor, develops electronic data for driving a display means that generates graphical images depicting game play.

23. An electronic gaming terminal as recited in claim 22 and further comprising read only memory (ROM) means for storing said operating system software, and encryption software for execution by said microprocessor to implement said first encryption means.

24. An electronic gaming terminal as recited in claim 23 and further comprising authentication means for authenticating all software executed by said microprocessor.

25. An electronic gaming terminal as recited in claim 24 wherein said player identification data corresponds to a unique personal identification number (PIN) assigned to a particular player.

26. An electronic gaming terminal as recited in claim 24 wherein said electronic locating means includes a radio navigation means responsive to input signals broadcast from multiple geostationary transmitting sources and operative to calculate position coordinates constituting said location data.

27. An electronic gaming terminal system as recited in claim 21 wherein said game playing means includes a microprocessor, operating software, and game software which, when processed by said microprocessor, develops electronic data for driving a display means that generates graphical images depicting game play.

28. An electronic gaming system as recited in claim 27 and further comprising read only (ROM) means for storing said operating system software and encryption software for execution by said microprocessor to implement said first encryption means.

29. An electronic gaming terminal as recited in claim 26 wherein said radio navigation means is a global positioning satellite (GPS) location system.

30. An electronic gaming terminal as recited in claim 28 wherein said encryption means is a public-key/private-key crypto system.

31. An electronic gaming terminal as recited in claim 21 wherein said communication means includes a modem for transmitting and receiving said encoded data to and from said communications medium via a telephone line.

32. An electronic gaming apparatus as recited in claim 31 wherein said communications medium includes the Internet.

33. An electronic gaming terminal as recited in claim 32 wherein said game player means includes microprocessor means, and further comprising CD ROM means for containing gaming software to be executed by said microprocessor means to develop gaming signals for driving a display screen to present a graphical depiction of the game to a player.

34. An electronic terminal for disposition at a location remote from a host server and for communicating with the host server in a secured transactional mode over an unsecured communications medium informing the host server as to the location of the terminal so that the host server can permit or deny remote user access to the host server via said terminal based at least in part on predetermined geopolitical or geographical restrictions, comprising:

electronic transaction entry means for enabling a user to enter user identification data, to enter transactional data, to commence transitional communication by causing a start signal to be generated, and for receiving an indication of completion of the transaction in the form of a response signal;

electronic locating means for generating geographical location data indicating the present geographical location of said terminal and for generating time data evidencing universal time;

encryption means for encoding said user identification data, said transactional data, said geographical location data and said time data; and communication means responsive to said start signal and operative to transmit the encoded data to a communications medium for communication to a host server.

35. A gaming method for enabling one or more players, disposed at locations remote from a [gambling] casino, to communicate over [on] *an* unsecured communications medium with the casino in a secured transactional mode wherein the casino is informed as to the location of the player terminals so that [it can permit or deny] game play *may be commenced or not* based in part on geopolitical or geographical restrictions, comprising [the steps]:

generating player identification data;

generating wager data;

generating geographical location data indicating the present geographical location of said player;

generating [universal] time data;

encoding said player identification data, said wager data, said location data, and said time data;

transmitting the encoded data to the casino through a communications medium;

[receiving the encoded data at said casino;

decoding the transmitted encoded data and using the decoded identification data, wager data, geographical location data and time data to determine the eligibility of the player, and if the player is qualified, generating] *receiving* a response *from the casino* notifying the player that [he] *the player* may commence gaming play *if the player is eligible on the basis of at least the identification data, geographical location data and time data*.

36. A gaming method as recited in claim 35 and further comprising [the steps of]:

commencing game play by extracting graphics data from a storage medium and sending a notice of play commencement to the casino;

using the extracted graphics data to generate graphical images of the game play for display to the player;

[using random number generating means at the casino to generate a game result and forwarding the said game result to the player] *receiving a forwarded result generated by a random number from the casino*; and using the forwarded result to indicate to the player the result of his wager.

37. A gaming method as recited in claim 36 wherein said location data is obtained by accessing radio signals transmitted by geostationary navigational transmitters, and by using the radio signals to compute player position coordinate information corresponding to said location data.

38. A gaming method as recited in claim 37 wherein said time data is also obtained by accessing said geostationary transmitters.

39. A gaming method as recited in claim 38 wherein said identification data, said wager data, said location data and said time data are encoded using a public-key/private-key crypto system.

[40. A gaming method as recited in claim 36 and further comprising the steps of:

opening a player account with the casino prior to commencing game play; and following each generation of a game result, crediting the player account in the event of a positive result, and debiting the player account in the event of a negative result.]

*41. A gaming method for enabling one or more players, disposed at locations remote from a casino, to communicate over an unsecured communications medium with the casino in a secured transactional mode wherein the casino is informed as to the location of the player terminals so that game play may be permitted or denied based in part on geopolitical or geographical restrictions, comprising:*

*receiving encoded data including player identification data, wager data, geographical location data indicating the present geographical location of the player associated with the player identification data, and time data transmitted from a player disposed at a location remote from a casino;*

*decoding the transmitted encoded data; and*

*using at least the decoded identification data, geographical location data and time data to determine the eligibility of the player, and if the player is qualified, generating a response notifying the player that the player may commence game play.*

*42. A gaming method as recited in claim 41 further comprising decoding the transmitted encoded data using a public-key/private-key crypto system.*

*43. A gaming method as recited in claim 41 further comprising:*

*using a random number generator to generate a game result; and*

*forwarding the game result to the player.*

*44. A gaming method as recited in claim 41 further comprising:*

*opening a player account with the casino prior to commencing game play; and*

*following each use of the random number generator to generate a game result, crediting the player account in the event of a positive result.*

*45. An electronic gaming terminal to be disposed at a location remote from a server and to communicate over an unsecured communications medium with the server in a secured transactional mode wherein the server is informed as to the location of the player terminals so that game play may be commenced or not based in part on geopolitical or geographical restrictions, the terminal comprising:*

*a player identification input device;*

*a wager input device;*

*a player tracking module capable of providing geographical location data indicating the present geographical location of said player and time data;*

*a communications interface capable of communication with a communications medium; and*

*a controller operatively coupled to the player identification input device, the wager input device, the player tracking module, and the communications interface, the controller comprising a processor and a memory operatively coupled to the processor,*

*the controller being programmed to generate player identification data;*

*the controller being programmed to generate wager data;*

*the controller being programmed to generate geographical location data indicating the present geographical location of said player;*

*the controller being programmed to generate time data;*

*the controller being programmed to encode the player identification data, the wager data, the location data, and the time data;*

*the controller being programmed to transmit the encoded data to the casino through a communications medium;*

*the controller being programmed to receive a response from the casino notifying the player that the player may commence game play if the player is eligible on the basis of at least the identification data, geographical location data and time data.*

*46. An electronic gaming system to be disposed at a location remote from a player terminal and to communicate over an unsecured communications medium with the player terminal in a secured transactional mode wherein the server is informed as to the location of the player terminal so that game play may be permitted or denied based in part on geopolitical or geographical restrictions, the server comprising:*

*a communications interface capable of communication with a communications medium; and*

*a controller operatively coupled to the communications interface, the controller comprising a processor and a memory operatively coupled to the processor,*

*the controller being programmed to receive encoded data including player identification date, wager data, geographical location data indicating the present geographical location of the player associated with the player identification data, and time data transmitted from a player disposed at a location remote from a casino;*

*the controller being programmed to decode the transmitted encoded data; and*

*the controller being programmed to determine the eligibility of the player using at least the decoded identification data, geographical location data and time data, and, if the player is qualified, to generate a response notifying the player that the player may commence game play.*

* * * * *